United States Patent [19]

Geiger

[11] 4,303,862
[45] Dec. 1, 1981

[54] CLEAR AIR TURBULENCE DETECTOR

[76] Inventor: Allen R. Geiger, 2600 E. Idaho #227, Las Cruces, N. Mex.

[21] Appl. No.: 58,505

[22] Filed: Jul. 18, 1979

[51] Int. Cl.³ .................... G01J 1/42; G01N 21/00
[52] U.S. Cl. .................................. 250/372; 356/342
[58] Field of Search .............. 250/372, 342, 574, 373, 250/461 B; 356/342, 338, 437, 438, 51, 337; 350/6.8; 73/170 R, 355 R

[56] References Cited

U.S. PATENT DOCUMENTS

| | | | |
|---|---|---|---|
| 2,222,937 | 11/1940 | Dimmick | 350/6.8 |
| 3,359,557 | 12/1967 | Fow et al. | 73/355 R |
| 3,415,984 | 12/1968 | Fründel | 250/372 |
| 3,499,159 | 3/1970 | Carrier et al. | |
| 3,528,743 | 9/1970 | Scott et al. | 250/574 |
| 3,696,670 | 10/1972 | Collis | 250/338 |
| 3,788,742 | 1/1974 | Garbury | 356/342 |
| 3,854,050 | 12/1974 | Peterson et al. | 250/461 B |
| 3,856,402 | 12/1974 | Low et al. | 356/342 |
| 3,984,686 | 10/1976 | Fletcher et al. | 250/347 |
| 4,015,257 | 3/1977 | Fetter | |

OTHER PUBLICATIONS

Melfi, "Remote Measurements of the Atmosphere Using Raman Scattering", Applied Optics, vol. 11, No. 7, Jul. 1972, pp. 1605–1610.

Kuhn et al., "Clear Air Turbulence: Detection by Infrared Observations of Water Vapor," Science, vol. 196, 6-3-77, pp. 1099–1100.

Kitamura et al., "Laser Radar System in Observing Atmospheric Conditions," Technol. Rep. Osaka Univ. (Japan), vol. 24, No. 1191–1229, Oct. 1974, pp. 545–555.

Primary Examiner—Alfred E. Smith
Assistant Examiner—Carolyn E. Fields
Attorney, Agent, or Firm—Allen D. Brufsky

[57] ABSTRACT

A clear air turbulence detector includes an ultraviolet laser for generating a coherent beam which scans an area on an aircraft's flight path. A photodetector monitors optical radiation backscattered from the area, providing an intensity-controlling electrical signal for a CRT display. Updrafts contain greater-than-normal amounts of ultraviolet-absorbing water vapor and result in a blank spot on the display while downdrafts contain less-than-normal amounts of water vapor and result in a bright spot on the display.

11 Claims, 9 Drawing Figures

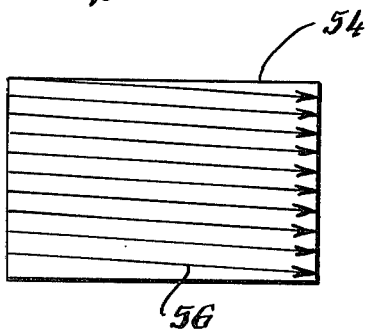
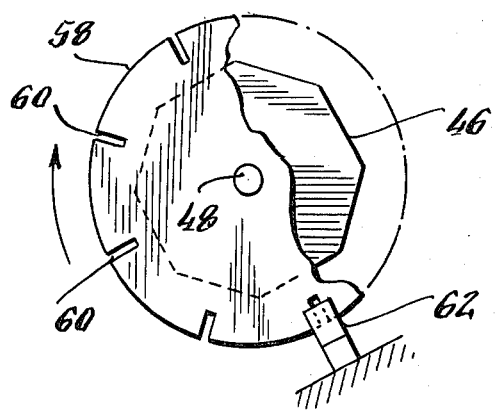
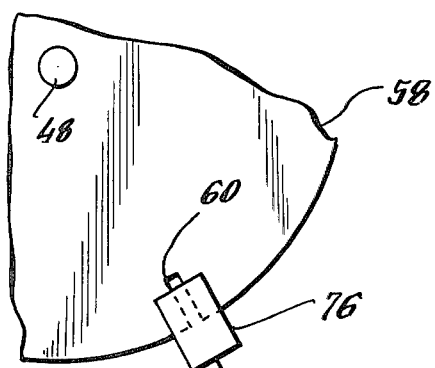
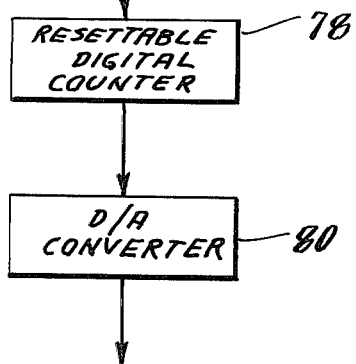
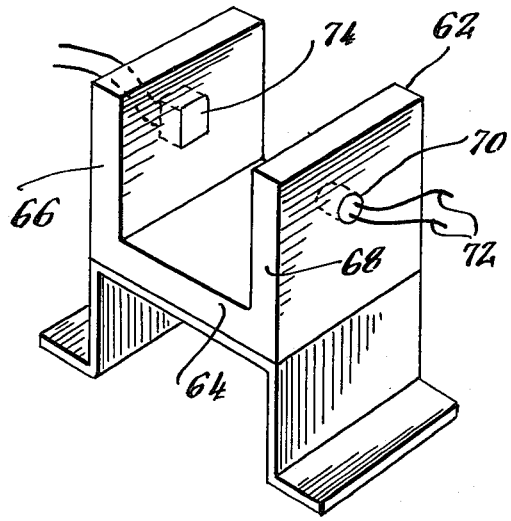
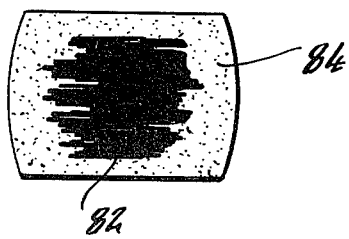
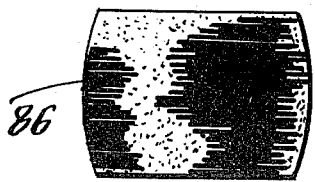

CLEAR AIR TURBULENCE DETECTOR

BACKGROUND OF THE INVENTION

The present invention relates to measuring and testing and more particularly to a clear air turbulence detector.

The phenomenon of clear air turbulence is generally regarded as one of the more significant problems to be solved in the field of aviation. Such turbulence is dangerous not only because of its potential severity but also because it occurs without warning in cloudless regions where flight crews may have relaxed in the expectation of stable flying conditions.

Many techniques and systems have been utilized in an attempt to detect clear air turbulence. These include acoustics, optical steller scintillation detection, microwave scintillation of radio, star and satellite becons, infrared and microwave backscatter, tropospheric bistatic radio scatter, ultrasensitive radar and the measurement of doppler shifts of backscattered return from atmospheric parcels subjected to short pulses of laser radiation.

The known systems have known disadvantages. Microwave systems generally require large antennas, making them generally unsuitable for airborne applications. Known optical systems have limited range. Many of the systems are so complex and costly as to make them economically unattractive.

SUMMARY OF THE INVENTION

The present invention is a relatively simple, low cost clear air turbulence detector.

A system made in accordance with the invention includes a laser device for providing a coherent beam of ultraviolet radiation. A scan generator directs the beam through a limited area on an aircraft's flight path. A photodetector responds to optical radiation backscattered from the area to provide electrical signals proportional to the intensity of the backscattered radiation. A display means is connected to the photodetector to provide a visual display of the relative intensity of the backscattered radiation. Clear air turbulence is indicated by non-uniformities on the visual display.

DESCRIPTION OF THE DRAWINGS

While the specification concludes with claims particularly pointing out and distinctly claiming that which is regarded as the present invention, details of a preferred embodiment of the invention may be more readily ascertained from the following detailed description when read in conjunction with the accompanying drawings wherein:

FIG. 4 shows the paths traveled by the scanning coherent beam;

FIG. 5 is a side view of a timing disc which may be used to generate a horizontal sweep synchronizing signal;

FIG. 6 is a perspective view of one type of photodetector which might be used with the timing disc of FIG. 5;

FIG. 7 is a simplified schematic view of circuitry which might be used to control the vertical position of an electron beam;

FIG. 8 represents a CRT display depicting an updraft condition; and

FIG. 9 represents a CRT display showing a downdraft condition.

DETAILED DESCRIPTION

Figure 1:
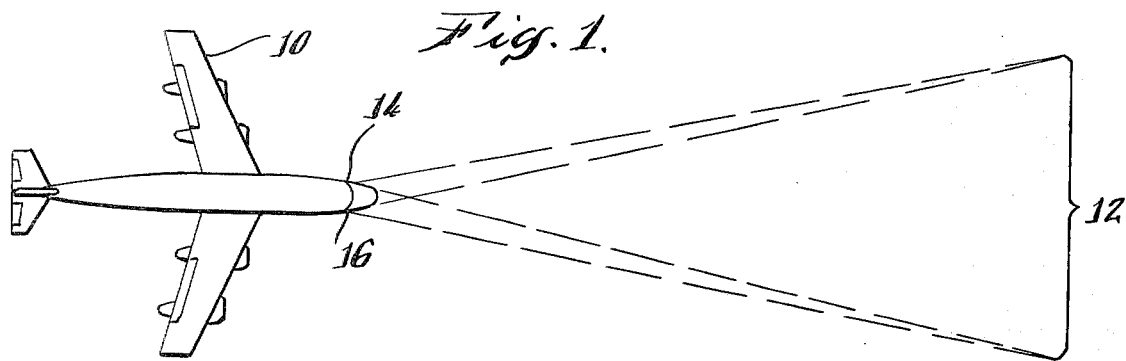
FIG. 1 is a top view of an aircraft showing the area scanned and monitored by an airborne detector constructed in accordance with the present invention.

Referring to FIG. 1, an aircraft 10 traveling along its predetermined flight path includes a unit for scanning a limited area 12 in front of the aircraft. As will be described in more detail later, the scanning is preferably performed by a source of coherent optical radiation indicated to originate at a point 14 on the fuselage of aircraft 10. The coherent radiation would be produced by a continuous wave laser which produces optical radiation having a wave length in the ultraviolet region. A certain amount of the laser radiation is backscattered from dust particles in the atmosphere while some will be absorbed by water vapor in the atmosphere.

Clear air turbulence is, at least in part, the result of abnormal levels of water vapor in discrete atmospheric volumes or parcels. The specific heat of water in such an air parcel provides the heat which causes that parcel to lose equilibrium with the surrounding atmosphere. More specifically, parcels having a greater-than-normal amount of water vapor are relatively warmer than the surrounding atmosphere and produce updrafts. Conversely, parcels having less-than-normal amounts of water vapor are cooler than the surrounding atmosphere and produce downdrafts. The rate at which an air parcel with abnormal water vapor content either descends or rises depends on how far from the adiabatic normal lapse rate the given air parcel is.

Optical radiation having a wave length in the ultraviolet range is generally absorbed by water vapor in the atmosphere. Therefore, a measurement of the amount of non-absorbed ultraviolet radiation will indicate whether a given atmospheric volume contains parcels with abnormal amounts of water vapor; that is, updrafts and downdrafts.

Since optical radiation will be reflected from dust particles in the atmosphere, a detector can be mounted at a location 16 on aircraft 10 to monitor the amount of returning or backscattered radiation from the scanned area. The backscattered radiation provides an input signal for a display which visually indicates updrafts or downdrafts in the scanned area.

Figure 2:
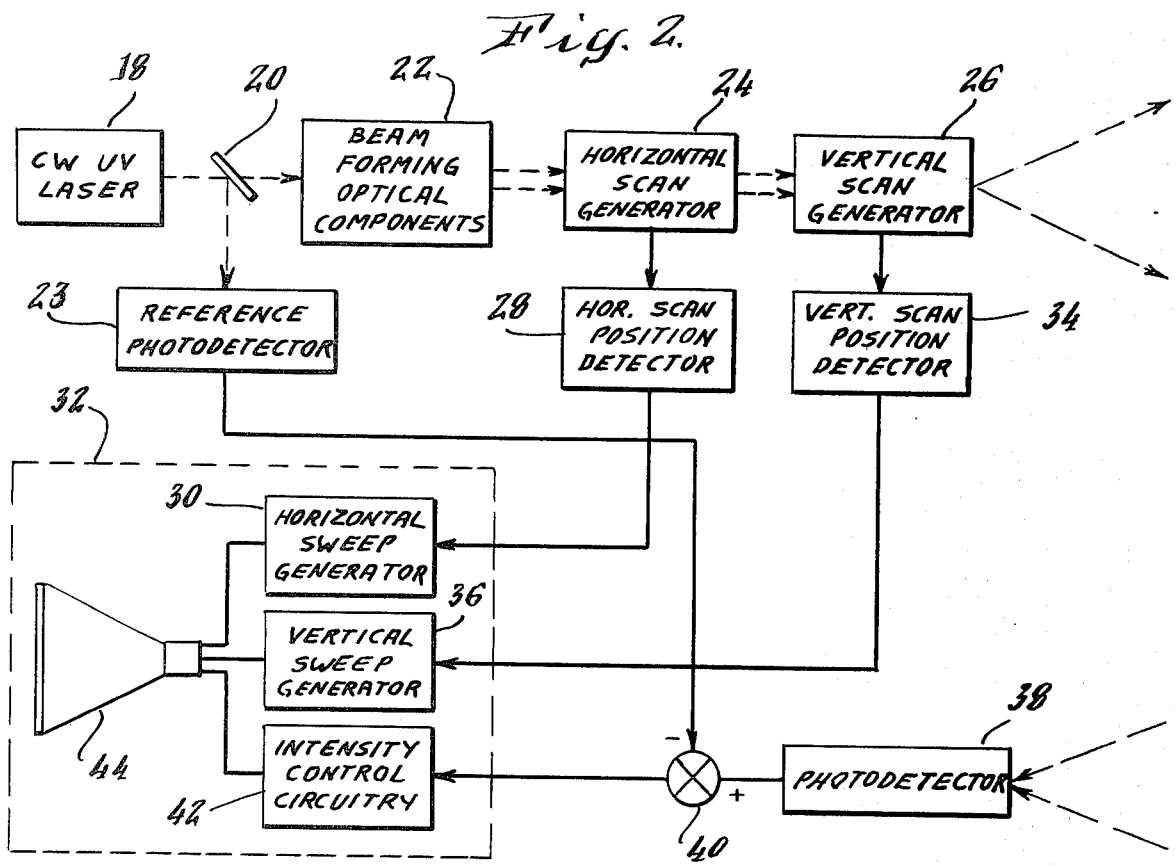
FIG. 2 is a block diagram of a system incorporating a present invention.

FIG. 2 is a block diagram of a system incorporating the present invention. In a preferred embodiment, the system includes a continuous wave laser 18 producing radiation having a wave length in the ultraviolet region. The coherent beam produced by the laser 18 is directed to a beam splitter 20 which directs most of the radiation to beam forming optical components 22 and a small part of the radiation to the reference photodetector 23.

The function of the beam forming optical components 22 is to enlarge the cross section of the beam by a limited amount so that a greater atmospheric area is scanned by the beam at the given time. Conventional optical components may be used.

The beam is then applied to a horizontal scan generator 24 which causes the beam to travel along a horizontal path. The output of horizontal scan generator 24, one embodiment of which will be described later, is applied to a vertical scan generator 26, which imparts a vertical component of movement to the beam during or between horizontal sweeps. The output of the vertical scan generator 26, an embodiment of which will also be described later, is a beam of ultraviolet radiation which sweeps through a given two dimensional area in much the same manner as an electron beam sweeps across the face of a television screen; that is, in a plurality of horizontal sweeps with each horizontal sweep being below the preceding sweep.

The operation of the horizontal scan generator 24 is monitored by a horizontal scan position detector 28 which generates a signal indicating that the beam is at the start of a horizontal scan. This signal is applied to a horizontal sweep generator circuit 30 within a cathode ray tube (CRT) display system 32. Similarly, the operation of the vertical scan generator 26 is monitored by a vertical scan position detector 34 to provide a signal relating to the vertical position of the optical beam. This vertical position signal is applied to a vertical sweep generator circuit 36 in the CRT display system 32.

As discussed above, some of the ultraviolet radiation which is emitted into the atmosphere will be absorbed by water vapor while some will be backscattered toward the aircraft by dust particles in the atmosphere. The backscattered or returning radiation is sensed by photodetector 38 which would be mounted at the position 16 on the aircraft. The photodetector 38, which is conventional in nature, generates an electrical signal having an intensity proportional to the amount of returned optical radiation. Assuming that the distribution of dust particles is relatively uniform throughout the atmospheric volume, the intensity of the electrical signal generated by the photodetector 38 is also inversely related to the amount of water vapor in parcels within the scanned atmospheric volume.

To cancel out the effects of any variation in the output of the laser 18, the output of the photodetector 38 and of the reference photodetector 23 are combined in a summing junction 40. The output of summing junction 40 is applied to an intensity control circuit 42 in the CRT display system 32.

The CRT display system 32, which includes a conventional cathode ray tube 44, operates in much the same manner as any conventional CRT system except that the operations of the horizontal sweep generator circuit 30 and of the vertical sweep generator circuit 36 are synchronized by signals received directly from the horizontal scan generator 24 and the vertical scan generator 26 rather than by information contained in the incoming signal.

The cathode ray tube 44 provides a display in which the intensity at any one point is determined by the amount of optical radiation returned to photodetector 38. Where the atmosphere is stable, the display will have a relatively uniform intensity. In regions having updrafts or downdrafts, the display will have a nonuniform intensity. The exact nature of the nonuniformities is described with reference to later figures.

Figure 3:
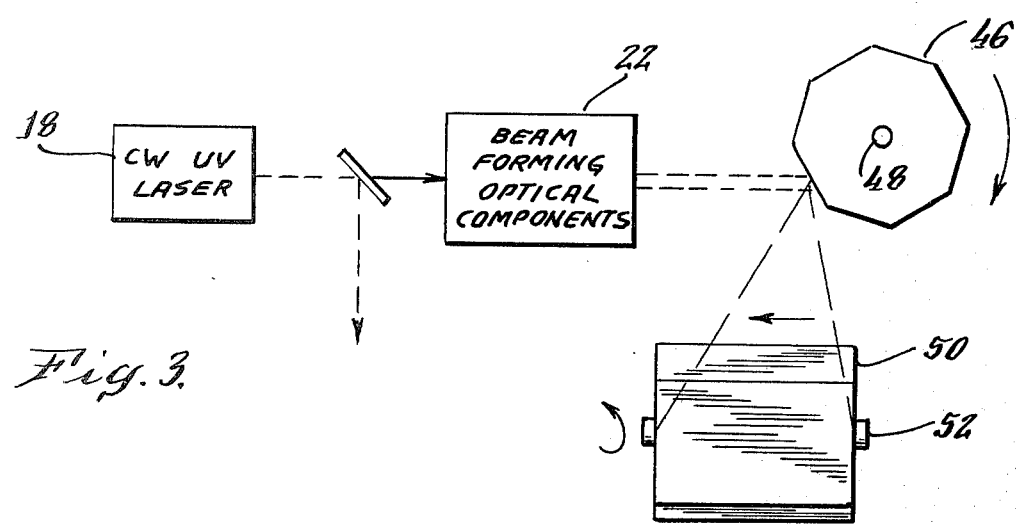
FIG. 3 is a simplified schematic diagram of one type of scan generator system for producing horizontal and vertical deflection of a coherent beam.

Referring first to FIG. 3, however, there is shown one embodiment of a horizontal scan generator and a vertical scan generator for use with the laser 18 and beam forming optical components 22. Horizontal scanning movement is produced by directing the laser beam at a drum 46 which is driven in a clockwise direction about an axis of rotation 48 which is perpendicular to the axis of the laser beam, by an electric motor (not shown). The surface of the drum 46 is made up of reflecting facets or mirrors. As each of the facets moves relative to the laser beam, the beam is reflected at varying angles from the facet surface. The changing angles of incidence (and consequently the changing angles of reflection) cause the beam to travel from right to left in a horizontal plane. This horizontally-traversisng beam is directed onto the surface of a second drum 50 which is driven about an axis 52, which is parrallel to the axis of the laser beam, by another electric motor (not shown). As the drum 50, having a plurality of faceted reflecting surfaces, turns relative to the horizontally-traversing laser beam, the beam will follow successive horizontal or nearly horizontal tracks, each of which falls below the preceding track.

Referring to FIG. 4, the movement of the laser beam produced by the rotation of the drums 46 and 50 is shown. As the drum 46 rotates, the laser beam will scan along horizontal or nearly horizontal lines, such as line 54 from left to right. Each scan line 54 represents the rotational movement of one of the facets of drum 46 past the impinging laser beam. As drum 50 rotates, the repeated horizontal traces follow below one another. The entire vertical field between the topmost horizontal scan line 54 and the bottommost horizontal scan line 56 is generated during the movement of a single facet on drum 50 past the laser beam.

Each of the horizontal traces has a slight downward slope to the right. This is brought about by the movement of the facet on drum 50 during each horizontal trace. If drum 50 were to be stepped through its cycle of rotation in small angular increments rather than continuously rotated, the traces 54 would be made to be completely horizontal. However, the slight vertical movement of the beam during each horizontal trace is not considered significant and a continuous or unstepped drive for drum 50 is preferred because of its simplicity.

FIG. 5 shows a simplified version of one form of horizontal position detector which might be used to control the horizontal scan of the laser beam. A disc 58 is mounted on the shaft 48 about which the first drum 46 rotates. Disc 58 is generally circular but includes a plurality of equally spaced notches 60 at its periphery. Each of the notches is aligned with that point on one of the mirror facets at which the facet causes the beam to begin a new horizontal trace. A photodetector 62 detects the presence of the slot to provide a synchronizing signal to the horizontal sweep generator circuitry for the CRT display.

The photodetector 62 is shown in more detail in FIG. 6. The detector 62 comprises a generally U-shaped block having a base or bight section 64 and upstanding arms 66 and 68. The arms 66 and 68 sit on opposite sides of the disc 58. Arm 68 includes a light source 70 which can be connected to a suitable electric supply through conductors 72. The arm 66 includes a photocell 74. The light path between the light source 70 and the photocell 74 is blocked by the disc 58 except when one of the peripheral slots 60 intervenes. When one of the slots 60 comes into alignment with source 70 and photocell 74, the optical path is completed causing photocell 74 to generate an electrical signal which can be applied to the horizontal sweep generator circuit 30 to cause the electron beam for the cathode ray tube 44 to be deflected to the start position for a new horizontal trace.

A synchronizing signal for returning the electron beam to the topmost horizontal scan line on the cathode ray tube 44 may be generated by using the same type of disc and photodetector arrangement with drum 50. However, since there are a large number of horizontal traces in a single vertical field, the vertical position of the laser beam within the field must be indicated by an auxiliary circuit which is triggered by such a photodetector arrangement. Referring to FIG. 7, the output from a photodetector 76 is used to reset a digital counter 78 which counts at a fixed rate proportional to the nominal speed of rotation of the drum 50. The output of digital counter 78 is applied to a digital to analog (D/A) converter 80 which provides a linearly increasing control signal to the vertical sweep generator circuit 36. The magnitude of the signal at the output of the D/A converter 80 controls the vertical position of the electron beam on the cathode ray tube 44. The circuitry causes the electron beam to move vertically downward in increments during scanning. When the photodetector 76 senses a slot in the timing disc, the resetting of digital counter 78 causes the electron beam to return to the topmost position in the field.

Referring now to FIG. 8, it was indicated earlier that stable atmospheric conditions produce a CRT display having a relatively uniform intensity since the generally uniform amount of water vapor existing in such an atmosphere causes ultraviolet radiation to be uniformly absorbed. Where the atmosphere contains an excessive amount of water vapor in a given limited volume of parcel, indicative of an updraft that parcel absorbs more ultraviolet radiation (and returns less) than the surrounding parcels. On the CRT display, this atmospheric condition is indicated by a blank or darker area 82 in an otherwise uniform field 84.

On the other hand, a downdraft is indicated by a brighter or more intense than normal area, such as the area 86 shown in FIG. 9. This is because the downdraft includes less-than-normal amounts of water vapor so that less ultraviolet radiation will be absorbed and more will be returned.

While there has been described what is considered to be a preferred embodiment of the invention, variations and modifications therein will occur to those skilled in the art once they become acquainted with the basic concepts of the invention. Therefore, it is intended that the appended claims shall be construed to include all such variations and modifications as fall within the true spirit and scope of the invention.

What is claimed is:

1. A system for use in an aircraft in flight for detecting clear air turbulence in a predetermined area along the aircraft's flight path comprising:
    a laser device for providing a coherent beam of optical radiation having a wavelength in the ultraviolet region;
    horizontal and vertical scan generator means for directing the coherent beam through a predetermined area in the aircraft's flight path which clear air turbulence is to be detected;
    a photodetector for detecting optical radiation backscattered from the predetermined area to produce electrical signals proportional to the intensity of the backscattered radiation; and
    display means connected to said photodetector and operating in synchronism with said horizontal and vertical scan generator means for providing a visual display of the intensity of backscattered radiation over the predetermined area, turbulence being indicated by nonuniformities in the visual display.

2. A system as defined in claim 1 wherein the display means comprises a cathode ray tube.

3. A system as defined in claim 2 wherein an updraft is indicated by a region of reduced intensity on the visual display while a downdraft is indicated by a region of increased intensity.

4. A system as defined in claim 3 wherein the scan generator means includes
    a first rotating drum having faceted reflecting surfaces, said first drum rotating about an axis perpendicular to the axis of the coherent beam; and
    a second rotating drum having faceted reflecting surfaces, said second drum rotating about an axis parallel to the axis of the coherent beam;
    said first drum providing a horizontal component of movement of the coherent beam while said second drum provides a vertical component of movement.

5. A system as defined in claim 4 wherein the horizontal and vertical sweep of the electron beam in said cathode ray tube is synchronized with the rotary positions of said first and second drums.

6. A system as defined in claim 1 and wherein the scan generator means comprises a horizontal scan generator which causes the beam to travel along a horizontal path and a vertical scan generator which imparts a vertical component of movement to the beam during or between horizontal sweeps.

7. A system as defined in claim 1 and further including means for cancelling out any variations in the intensity of the coherent beam of optical radiation emitted by the laser device.

8. A system as defined in claim 1 and wherein the laser device is a continuous wave laser device.

9. A method of detecting clear air turbulence along the flight path of a flying aircraft comprising the steps of:
    directing a coherent beam of ultraviolet radiation in a rectilinear manner through a predetermined area to be monitored in the flightpath of the flying aircraft; and
    providing a visual display of the intensity of backscattered optical radiation over the predetermined area with updrafts being identifiable as regions of relatively lesser backscattered radiation and downdrafts being identifiable as regions of relatively greater backscattered radiation.

10. A method as defined in claim 9 wherein the coherent beam undergoes both horizontal and vertical deflection as it is directed through the area being monitored.

11. A method of claim 9 and wherein the coherent beam of ultraviolet radiation is continuous.

* * * * *